United States Patent
Chu

(10) Patent No.: US 8,629,944 B2
(45) Date of Patent: Jan. 14, 2014

(54) TRANSPARENT CONDUCTIVE STRUCTURE APPLIED TO A TOUCH PANEL AND METHOD OF MAKING THE SAME

(75) Inventor: Chao-Chieh Chu, Hsinchu (TW)

(73) Assignee: Innovation & Infinity Global Corp., Hsinchu (TW)

( * ) Notice: Subject to any disclaimer, the term of this patent is extended or adjusted under 35 U.S.C. 154(b) by 359 days.

(21) Appl. No.: 13/100,267

(22) Filed: May 3, 2011

(65) Prior Publication Data
US 2012/0279759 A1    Nov. 8, 2012

(51) Int. Cl.
*G02F 1/1335* (2006.01)
(52) U.S. Cl.
USPC .......................................................... 349/12
(58) Field of Classification Search
USPC .......................................................... 349/12
See application file for complete search history.

(56) References Cited

U.S. PATENT DOCUMENTS

| | | | |
|---|---|---|---|
| 6,204,896 B1 * | 3/2001 | Matsuhira et al. | 349/12 |
| 6,559,902 B1 * | 5/2003 | Kusuda et al. | 349/12 |
| 6,590,622 B1 * | 7/2003 | Nakanishi et al. | 349/12 |

\* cited by examiner

*Primary Examiner* — James Dudek
(74) *Attorney, Agent, or Firm* — Li & Cai Intellectual Property (USA) Office

(57) ABSTRACT

A transparent conductive structure applied to a touch panel includes a substrate unit, a first coating unit, a transparent conductive unit, and a second coating unit. The substrate unit includes a transparent substrate. The first coating unit includes a first coating layer formed on the top surface of the transparent substrate. The transparent conductive unit includes a transparent conductive layer formed on the top surface of the first coating layer. The transparent conductive layer includes a plurality of conductive circuits arranged to form a predetermined circuit pattern. The second coating unit includes a second coating layer formed on the top surface of the transparent conductive layer. The second coating layer has a touching surface formed on the top side thereof for an external object to touch. The second coating layer is substantially formed by mixing silicon oxide, aluminum oxide, lithium oxide and Teflon.

10 Claims, 7 Drawing Sheets

TRANSPARENT CONDUCTIVE STRUCTURE APPLIED TO A TOUCH PANEL AND METHOD OF MAKING THE SAME

BACKGROUND OF THE INVENTION

1. Field of the Invention

The instant disclosure relates to a transparent conductive structure and a method of making the same, and more particularly, to a transparent conductive structure applied to a touch panel and a method of making the same.

2. Description of Related Art

Touch panels can be produced in a variety of types and sizes without mouse, button or direction key and can be used as input part of a wide variety of electronic devices. With information appliance developing, the touch panels have replaced keyboard and mouse to communicate with the information appliance. The touch panels provide users a friendly interface such that operations of computers or electronic products become simple, straightforward, lively and interesting. Depending on fields of applications, touch panels are applied to portable communication and information products (for example, personal digital assistant (PDA)), financial/commercial system, medical registration system, monitoring system, information guiding system, and computer-aided teaching system, and thereby enhancing convenience of handling for users.

Generally speaking, touch panels may be operated by means of infrared, ultrasonic, piezoelectric, capacitive or resistive sensing. The capacitive touch panel has inner wires made of transparent conductive materials on a glass substrate, and transmitting signals to integrated circuits (IC) configured on an outer flexible PCB or rigid PCB via peripheral conductive wires on the glass substrate. Such structure constitutes a touch sensor, which configured to an outer printed circuit board and a top protecting cover to complete a touch panel. A uniform electric field is generated on surface of the glass substrate when touching. Coordinates of the contact point are determined by variation of capacitance due to electrostatic reaction generated between the user's finger and the electric field when a user touches the touch panel.

Referring to FIG. 1, the related art provides a transparent conductive structure applied to a touch panel, comprising: a PET substrate 1a, a hard coating layer 2a formed on the top surface of the PET substrate 1a, a plurality of conductive circuits 3a formed on the bottom surface of the PET substrate 1a, and a protection layer 4a formed on the bottom surface of the PET substrate 1a to cover and protect the conductive circuits 3a. However, the distance between each conductive circuit 3a and the top surface 20a (the touching surface for user to touch) of the hard coating layer 2a is too large, thus the ultra-low conductive material with the conductive range (the electric conductivity) less than 0.3 ohm/square needs to be used to make the conducive circuits 3a for achieving a predetermined sensing requirement.

SUMMARY OF THE INVENTION

One particular aspect of the instant disclosure is to provide a transparent conductive structure applied to a touch panel and a method of making the same.

One of the embodiments of the instant disclosure provides a transparent conductive structure applied to a touch panel, comprising: a substrate unit, a first coating unit, a transparent conductive unit, and a second coating unit. The substrate unit includes at least one transparent substrate. The first coating unit includes at least one first coating layer formed on the top surface of the at least one transparent substrate. The transparent conductive unit includes at least one transparent conductive layer formed on the top surface of the at least one first coating layer, wherein the at least one transparent conductive layer includes a plurality of conductive circuits, and the conductive circuits are arranged to form a predetermined circuit pattern. The second coating unit includes at least one second coating layer formed on the top surface of the at least one transparent conductive layer, wherein the at least one second coating layer has a touching surface formed on the top side thereof, the touching surface allows an external object (such as user's finger, any type of touch pen, or etc.) to touch, and the at least one second coating layer is substantially formed by mixing silicon oxide, aluminum oxide, lithium oxide and polytetrafluoroethylene.

One of the embodiments of the instant disclosure provides a method of making a transparent conductive structure applied to a touch panel, comprising the steps of: providing a substrate unit including at least one transparent substrate; forming at least one first coating layer on the top surface of the at least one transparent substrate; forming at least one transparent conductive layer on the top surface of the at least one first coating layer, wherein the at least one transparent conductive layer includes a plurality of conductive circuits, and the conductive circuits are arranged to form a predetermined circuit pattern; and then forming at least one second coating layer on the top surface of the at least one transparent conductive layer, wherein the at least one second coating layer has a touching surface formed on the top side thereof, the touching surface allows an external object (such as user's finger, any type of touch pen, or etc.) to touch, and the at least one second coating layer is substantially formed by mixing silicon oxide, aluminum oxide, lithium oxide and polytetrafluoroethylene.

Moreover, the at least one transparent substrate is polyethylene terephthalate (PET), poly carbonate (PC), polyethylene (PE), poly vinyl chloride (PVC), poly propylene (PP), poly styrene (PS), or polymethylmethacrylate (PMMA), and the thickness of the at least one transparent substrate is between 50 μm and 125 μm. The at least one first coating layer is a hard coating layer, the hard coating layer is an ultraviolet hardening layer, wherein each conductive circuit is a silver circuit, an aluminum circuit, or a copper circuit, and the conductive range of the predetermined circuit pattern is between 0.8 and 3 ohm/square, wherein the at least one second coating layer is a hard protection layer. The conductive circuits are divided into a plurality of X-axis tracks extended along a transverse direction and a plurality of Y-axis tracks extended along a lengthwise direction and respectively insulated from and vertical to the X-axis tracks, the thickness of each conductive circuit is between 3000 Å and 5000 Å, the width of each X-axis track is between 3000 Å and 5000 Å, the distance between every two X-axis track is between 10 μm and 20 μm, the width of each Y-axis track is between 1000 Å and 2000 Å, and the distance between every two Y-axis track is between 5 μm and 15 μm. In addition, the silicon oxide may occupy 60%~95% of the at least one second coating layer 40 by weight, the aluminum oxide may occupy 20%·25% of the at least one second coating layer 40 by weight, the lithium oxide may occupy 5%~10% of the at least one second coating layer 40 by weight, and the polytetrafluoroethylene (Teflon®) may occupy 5%~10% of the at least one second coating layer 40 by weight.

Therefore, the distance between the touching surface of the at least one second coating layer and the predetermined circuit pattern of the transparent conductive unit is reduced (the touching surface is very close to the predetermined circuit pattern), thus the conductive range (the electric conductivity) of the predetermined circuit pattern P may be substantially between 0.8 ohm/square (Ω/□) and 3 ohm/square (Ω/□) without using conductive circuits made of ultra-low conductive material. Moreover, the at least one second coating layer may be a high wear-resisting and low friction hard protection layer can be substantially formed by mixing silicon oxide, aluminum oxide, lithium oxide and polytetrafluoroethylene.

To further understand the techniques, means and effects the instant disclosure takes for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention that they be used for limiting the instant disclosure.

DETAILED DESCRIPTION OF THE PREFERRED EMBODIMENTS

First Embodiment

Figure 1:
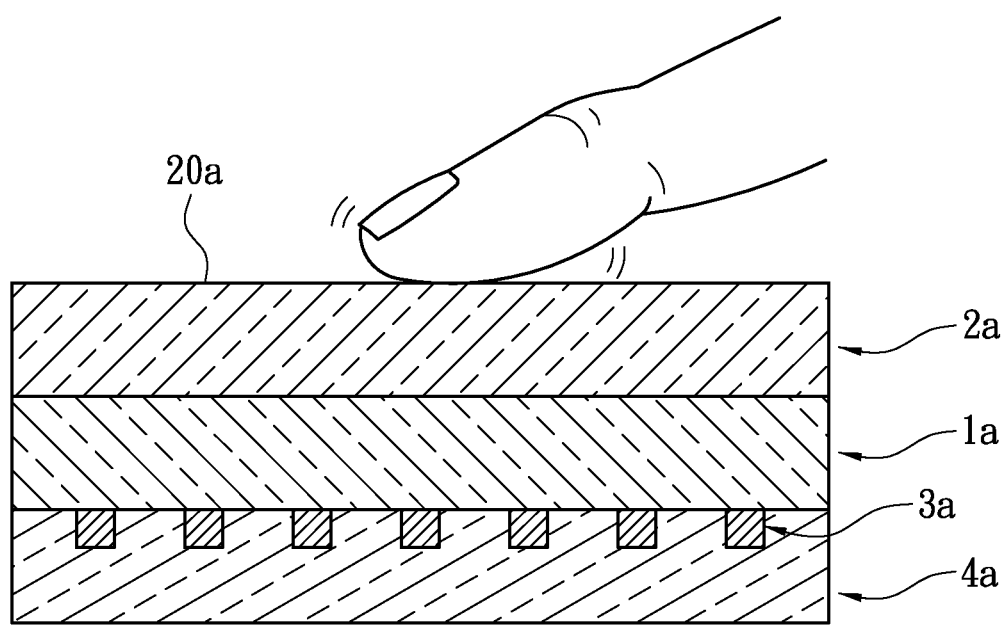
FIG. 1 shows a lateral, cross-sectional, schematic view of the transparent conductive structure applied to a touch panel according to the related art.
Figure 2:
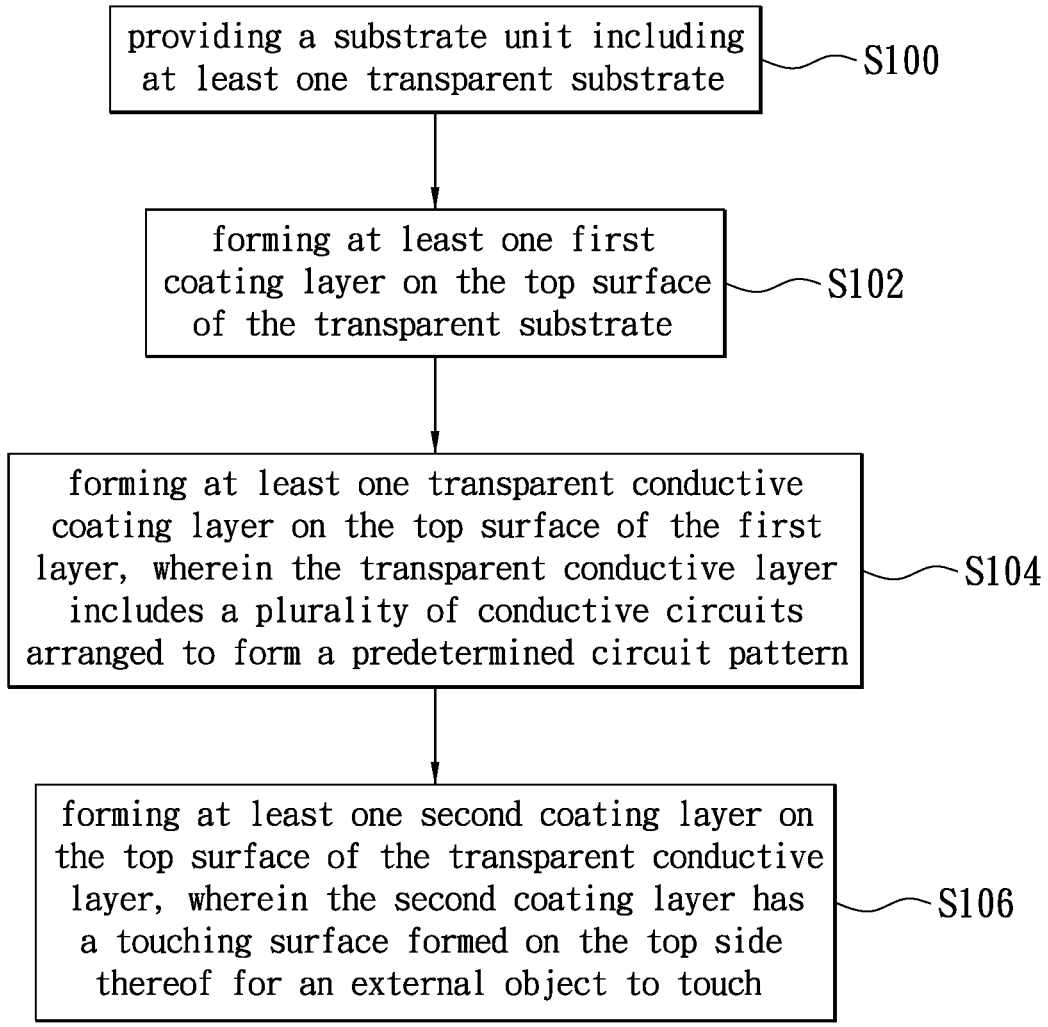
FIG. 2 shows a flowchart of the method of making the transparent conductive structure applied to a touch panel according to the first embodiment of the instant disclosure.
Figure 2A:
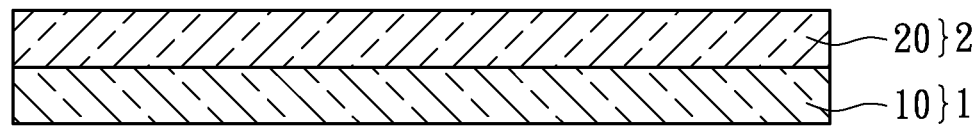
FIG. 2A shows a lateral, cross-sectional, schematic view of the semi-finished transparent conductive structure through the step S100 and the step S102 according to the first embodiment of the instant disclosure.
Figure 2B:
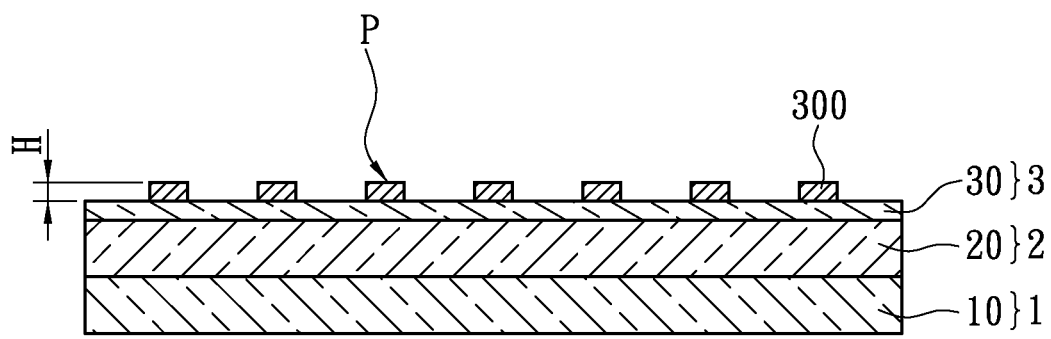
FIG. 2B shows a lateral, cross-sectional, schematic view of the semi-finished transparent conductive structure through the step S104 according to the first embodiment of the instant disclosure.
Figure 2C:
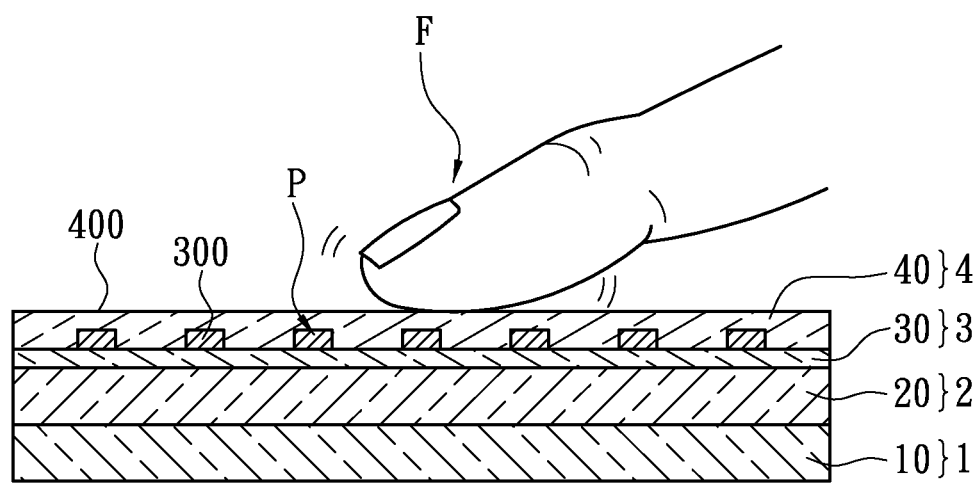
FIG. 2C shows a lateral, cross-sectional, schematic view of the finished transparent conductive structure through the step S106 according to the first embodiment of the instant disclosure.
Figure 3:
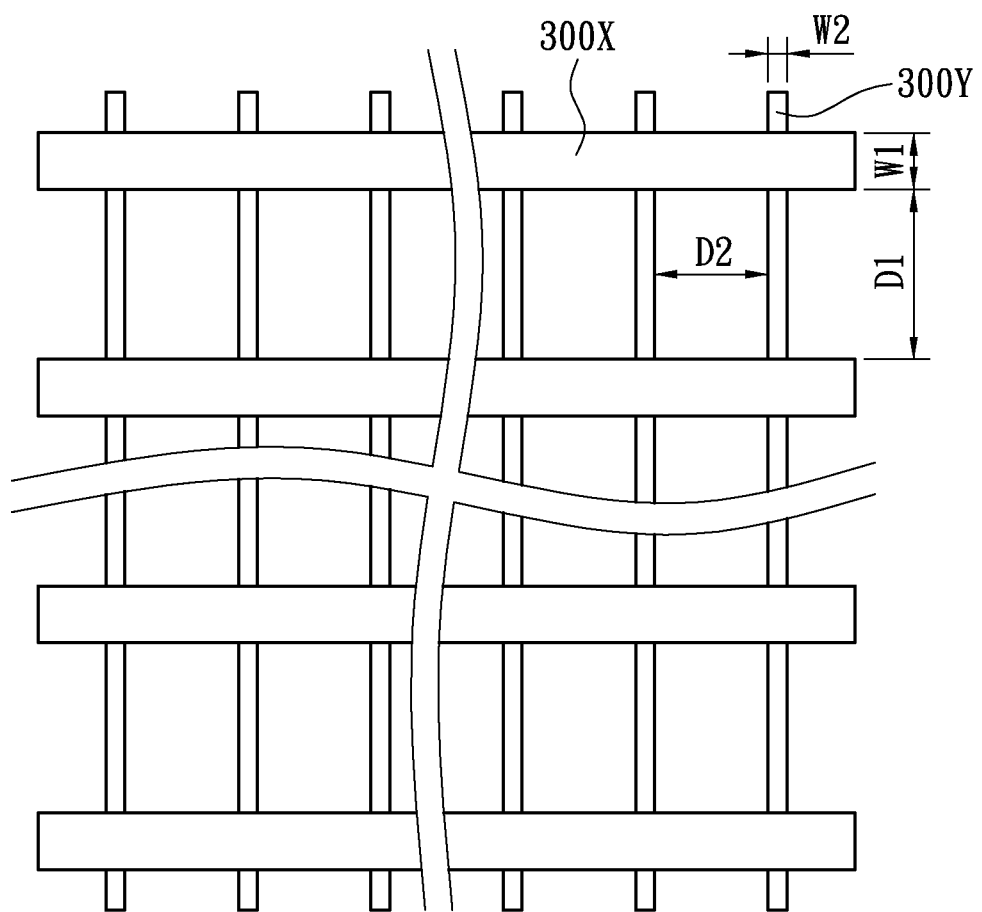
FIG. 3 shows a top schematic view of the conductive circuits according to the first embodiment of the instant disclosure.

Referring to FIGS. 2, 2A-2C, and 3, where FIG. 2 shows a flowchart of the method of making the transparent conductive structure applied to a touch panel according to the first embodiment of the instant disclosure, FIG. 2A shows a lateral, cross-sectional, schematic view of the semi-finished transparent conductive structure through the step S100 and the step S102 according to the first embodiment of the instant disclosure, FIG. 2B shows a lateral, cross-sectional, schematic view of the semi-finished transparent conductive structure through the step S104 according to the first embodiment of the instant disclosure, FIG. 2C shows a lateral, cross-sectional, schematic view of the finished transparent conductive structure through the step S106 according to the first embodiment of the instant disclosure, and FIG. 3 shows a top schematic view of the conductive circuits according to the first embodiment of the instant disclosure. The first embodiment of the instant disclosure provides a method of making a transparent conductive structure applied to a touch panel, substantially comprising the steps of (from the step S100 to the step 106 in FIG. 2):

The step S100 is that: referring to FIGS. 2 and 2A, providing a substrate unit 1 including at least one transparent substrate 10. For example, the at least one transparent substrate 10 may be one of polyethylene terephthalate (PET), poly carbonate (PC), polyethylene (PE), poly vinyl chloride (PVC), poly propylene (PP), poly styrene (PS), and polymethylmethacrylate (PMMA), and the thickness of the at least one transparent substrate 10 is substantially between 50 μm and 125 μm. In other words, the at least one transparent substrate 10 can be made of any material such as plastic or glass, etc. according to different requirements.

The step S102 is that: referring to FIGS. 2 and 2A, forming at least one first coating layer 20 on the top surface of the at least one transparent substrate 10. For example, the at least one first coating layer 20 may be a hard coating layer made of hard material. In other words, the at least one first coating layer 20 can be made of any hard material according to different requirements, such as the at least one first coating layer 20 can be an ultraviolet hardening layer made of ultraviolet hardening material.

The step S104 is that: referring to FIGS. 2 and 2B, forming at least one transparent conductive layer 30 on the top surface of the at least one first coating layer 20, wherein the at least one transparent conductive layer 30 includes a plurality of conductive circuits 300, and the conductive circuits 300 are arranged to form a predetermined circuit pattern P. For example, the conductive circuits 300 can be an indium tin oxide (ITO) conductive layer, and the conductive circuits 300 can be formed on the top surface of the at least one transparent conductive layer 30. Each conductive circuit 300 may be a silver circuit made of silver material, an aluminum circuit made of aluminum material, a copper circuit made of copper material, or any conductive circuit made of any conductive material according to different requirements. Moreover, the conductive range (the electric conductivity) of the predetermined circuit pattern P may be substantially between 0.8 and 3 ohm/square without using conductive circuits made of ultra-low conductive material. In other words, the conductive circuits 300 can be formed on the top surface of the at least one transparent conductive layer 30 to form the predetermined circuit pattern P according to different conductive ranges.

Furthermore, referring to FIGS. 2B and 3, the conductive circuits 300 are divided into a plurality of X-axis tracks 300X extended along a transverse direction and a plurality of Y-axis tracks 300Y extended along a lengthwise direction and respectively insulated from and vertical to the X-axis tracks 300X, and the transverse direction is substantially vertical to the lengthwise direction. In addition, the thickness H (as shown in FIG. 2B) of each conductive circuit 300 is substantially between 3000 Å and 5000 Å, the width W1 of each X-axis track 300X is substantially between 3000 Å and 5000 Å, the distance D1 between every two X-axis track is substantially between 10 μm and 20 μm, the width W2 of each Y-axis track 300Y is substantially between 1000 Å and 2000 Å, and the distance D2 between every two Y-axis track 300Y is substantially between 5 μm and 15 μm.

The step S106 is that: referring to FIGS. 2 and 2C, forming at least one second coating layer 40 on the top surface of the at least one transparent conductive layer 30, wherein the at least one second coating layer 40 has a touching surface 400 formed on the top side thereof, and the touching surface 400 allows an external object (such as user's finger F, any type of touch pen, or etc.) to touch. For example, the conductive circuits 300 are formed on the top surface of the at least one transparent conductive layer 30, thus the conductive circuits 300 can be covered by the at least one second coating layer 40. In addition, the at least one second coating layer 40 may be a hard protection layer made of hard material, and the hard protection layer has a thickness substantially between 3 μm and 5 μm. For example, the at least one second coating layer 40 can be substantially formed by mixing silicon oxide (such as $SiO_2$), aluminum oxide (such as $Al_2O_3$), lithium oxide and polytetrafluoroethylene. In addition, the silicon oxide may occupy 60%~95% of the at least one second coating layer 40 by weight, the aluminum oxide may occupy 20%~25% of the at least one second coating layer 40 by weight, the lithium oxide may occupy 5%~10% of the at least one second coating layer 40 by weight, and the polytetrafluoroethylene may occupy 5%~10% of the at least one second coating layer 40 by weight.

Referring to FIGS. 2C and 3 again, the first embodiment of the instant disclosure provides a transparent conductive structure applied to a touch panel, comprising: a substrate unit 1, a first coating unit 2, a transparent conductive unit 3, and a second coating unit 4. The substrate unit 1 includes at least one transparent substrate 10. The first coating unit 2 includes at least one first coating layer 20 formed on the top surface of the at least one transparent substrate 10. The transparent conductive unit 3 includes at least one transparent conductive layer 30 formed on the top surface of the at least one first coating layer 20. The at least one transparent conductive layer 30 includes a plurality of conductive circuits 300, and the conductive circuits 300 are arranged to form a predetermined circuit pattern P. The second coating unit 4 includes at least one second coating layer 40 formed on the top surface of the at least one transparent conductive layer 30. The at least one second coating layer 40 has a touching surface 400 formed on the top side thereof, and the touching surface 400 allows an external object (such as user's finger F, any type of touch pen, or etc.) to touch. In addition, the at least one second coating layer 40 can be substantially formed by mixing silicon oxide (such as $SiO_2$), aluminum oxide (such as $Al_2O_3$), lithium oxide and polytetrafluoroethylene.

For example, the at least one transparent substrate 10 may be polyethylene terephthalate (PET), poly carbonate (PC), polyethylene (PE), poly vinyl chloride (PVC), poly propylene (PP), poly styrene (PS), or polymethylmethacrylate (PMMA), and the thickness of the at least one transparent substrate is between 50 μm and 125 μm. The at least one first coating layer 20 may be a hard coating layer, and the hard coating layer may be an ultraviolet hardening layer. Each conductive circuit 300 may be a silver circuit made of silver material, an aluminum circuit made of aluminum material, a copper circuit made of copper material, or any conductive circuit made of any conductive material according to different requirements. Moreover, the conductive range (the electric conductivity) of the predetermined circuit pattern P may be substantially between 0.8 and 3 ohm/square without using conductive circuits made of ultra-low conductive material.

Furthermore, referring to FIG. 3, the conductive circuits 300 are divided into a plurality of X-axis tracks 300X extended along a transverse direction and a plurality of Y-axis tracks 300Y extended along a lengthwise direction and respectively insulated from and vertical to the X-axis tracks 300X, and the transverse direction is substantially vertical to the lengthwise direction. In addition, the thickness H (as shown in FIG. 2B) of each conductive circuit 300 is substantially between 3000 Å and 5000 Å, the width W1 of each X-axis track 300X is substantially between 3000 Å and 5000 Å, the distance D1 between every two X-axis track is substantially between 10 μm and 20 μm, the width W2 of each Y-axis track 300Y is substantially between 1000 Å and 2000 Å, and the distance D2 between every two Y-axis track 300Y is substantially between 5 μm and 15 μm. Moreover, the conductive circuits 300 are formed on the top surface of the at least one transparent conductive layer 30, and the conductive circuits 300 are covered by the at least one second coating layer 40. In addition, the at least one second coating layer 40 may be a hard protection layer made of hard material.

Second Embodiment

Figure 4:
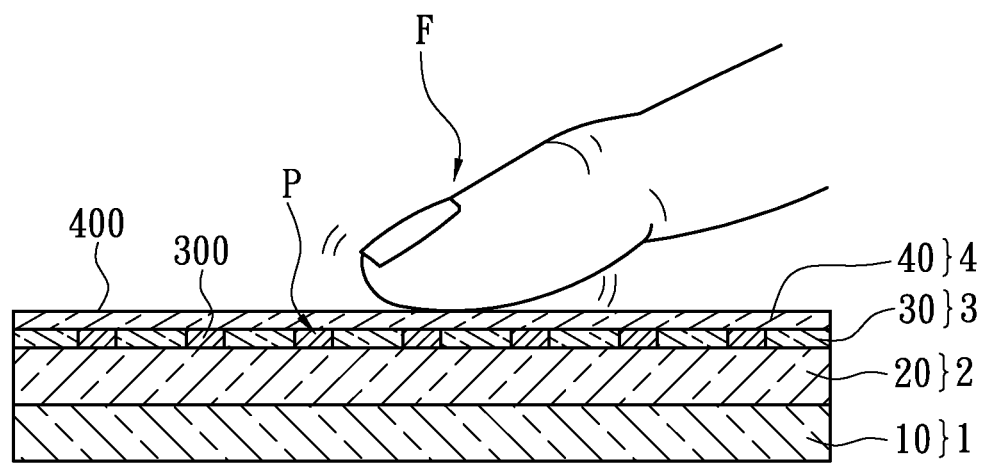
FIG. 4 shows a lateral, cross-sectional, schematic view of the transparent conductive structure according to the second embodiment of the instant disclosure.

Referring to FIG. 4, where FIG. 4 shows a lateral, cross-sectional, schematic view of the transparent conductive structure according to the second embodiment of the instant disclosure. The second embodiment of the instant disclosure provides a transparent conductive structure applied to a touch panel, comprising: a substrate unit 1, a first coating unit 2, a transparent conductive unit 3, and a second coating unit 4.

The substrate unit 1 includes at least one transparent substrate 10. The first coating unit 2 includes at least one first coating layer 20 formed on the top surface of the at least one transparent substrate 10. The transparent conductive unit 3 includes at least one transparent conductive layer 30 formed on the top surface of the at least one first coating layer 20. The at least one transparent conductive layer 30 includes a plurality of conductive circuits 300, and the conductive circuits 300 are arranged to form a predetermined circuit pattern P. The second coating unit 4 includes at least one second coating layer 40 formed on the top surface of the at least one transparent conductive layer 30. The at least one second coating layer 40 has a touching surface 400 formed on the top side thereof, and the touching surface 400 allows an external object (such as user's finger F, any type of touch pen, or etc.) to touch. In addition, the at least one second coating layer 40 can be substantially formed by mixing silicon oxide (such as $SiO_2$), aluminum oxide (such as $Al_2O_3$), lithium oxide and polytetrafluoroethylene. For example, the silicon oxide may occupy 60%~95% of the at least one second coating layer 40 by weight, the aluminum oxide may occupy 20%~25% of the at least one second coating layer 40 by weight, the lithium oxide may occupy 5%~10% of the at least one second coating layer 40 by weight, and the polytetrafluoroethylene may occupy 5%~10% of the at least one second coating layer 40 by weight.

Comparing to FIG. 4 with FIG. 2C, the difference between the second embodiment and the first embodiment is that: in the second embodiment, the conductive circuits 300 are embedded into the at least one transparent conductive layer 30 to form a plurality of embedded conductive circuits. For example, the top surface of each conductive circuit 300 is exposed and flushed with the top surface of the at least one transparent conductive layer 30, thus the conductive circuits 300 can be covered by the at least one second coating layer 40. In other words, the conductive circuits 300 can be formed inside the transparent conductive layer 30 to form the predetermined embedded circuit pattern P according to different conductive ranges. For example, the conductive circuits 300 can be rolled and embedded into the transparent conductive layer 30 by rolling. Hence, the conductive range (the electric conductivity) of the predetermined embedded circuit pattern P may be substantially between 0.8 and 3 ohm/square without using conductive circuits made of ultra-low conductive material.

Third Embodiment

Figure 5:
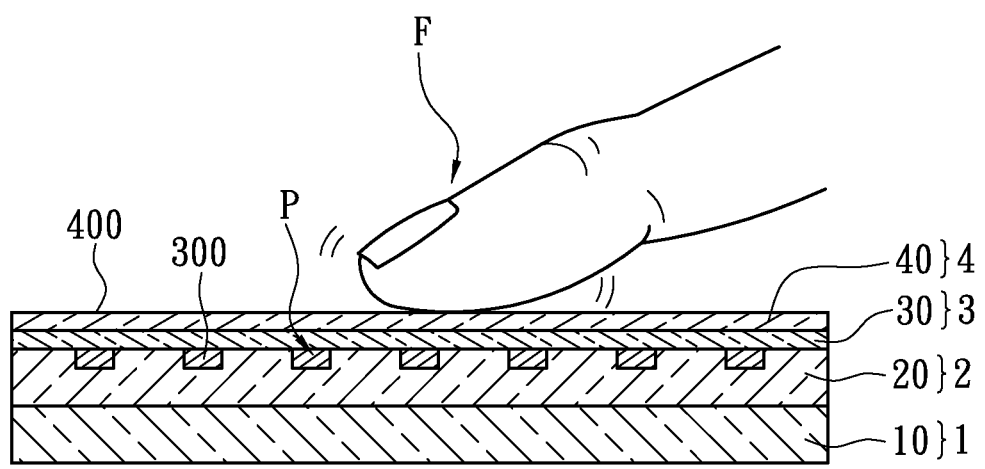
FIG. 5 shows a lateral, cross-sectional, schematic view of the transparent conductive structure according to the third embodiment of the instant disclosure.

Referring to FIG. 5, where FIG. 5 shows a lateral, cross-sectional, schematic view of the transparent conductive structure according to the third embodiment of the instant disclosure. The third embodiment of the instant disclosure provides a transparent conductive structure applied to a touch panel, comprising: a substrate unit 1, a first coating unit 2, a transparent conductive unit 3, and a second coating unit 4.

The substrate unit 1 includes at least one transparent substrate 10. The first coating unit 2 includes at least one first coating layer 20 formed on the top surface of the at least one transparent substrate 10. The transparent conductive unit 3 includes at least one transparent conductive layer 30 formed on the top surface of the at least one first coating layer 20. The at least one transparent conductive layer 30 includes a plurality of conductive circuits 300, and the conductive circuits 300 are arranged to form a predetermined circuit pattern P. The second coating unit 4 includes at least one second coating layer 40 formed on the top surface of the at least one transparent conductive layer 30. The at least one second coating layer 40 has a touching surface 400 formed on the top side thereof, and the touching surface 400 allows an external object (such as user's finger F, any type of touch pen, or etc.) to touch. In addition, the at least one second coating layer 40 can be substantially formed by mixing silicon oxide (such as $SiO_2$), aluminum oxide (such as $Al_2O_3$), lithium oxide and polytetrafluoroethylene. For example, the silicon oxide may occupy 60%~95% of the at least one second coating layer 40 by weight, the aluminum oxide may occupy 20%~25% of the at least one second coating layer 40 by weight, the lithium oxide may occupy 5%~10% of the at least one second coating layer 40 by weight, and the polytetrafluoroethylene may occupy 5%~10% of the at least one second coating layer 40 by weight.

Comparing to FIG. 5 with FIG. 2C, the difference between the third embodiment and the first embodiment is that: in the third embodiment, the conductive circuits 300 are formed on the bottom surface of the at least one transparent conductive layer 30 and embedded into the at least one first coating layer 20 to form a plurality of embedded conductive circuits. In other words, the conductive circuits 300 can be formed on the bottom surface of the transparent conductive layer 30 and inside the first coating layer 20 to form the predetermined embedded circuit pattern P according to different conductive ranges. For example, the conductive circuits 300 can be rolled and embedded into the first coating layer 20 by rolling. Hence, the conductive range (the electric conductivity) of the predetermined embedded circuit pattern P may be substantially between 0.8 and 3 ohm/square without using conductive circuits made of ultra-low conductive material.

Fourth Embodiment

Figure 6:
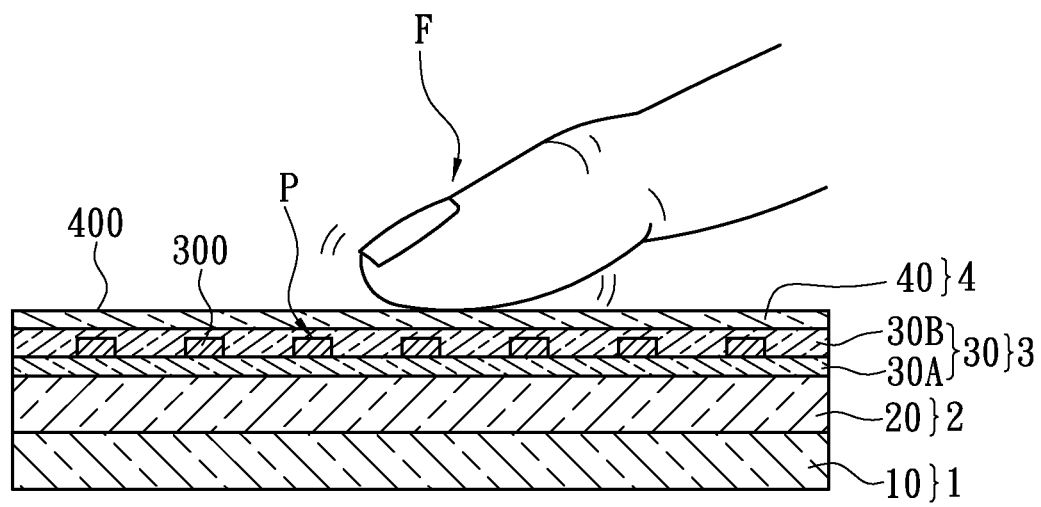
FIG. 6 shows a lateral, cross-sectional, schematic view of the transparent conductive structure according to the fourth embodiment of the instant disclosure.

Referring to FIG. 6, where FIG. 6 shows a lateral, cross-sectional, schematic view of the transparent conductive structure according to the fourth embodiment of the instant disclosure. The fourth embodiment of the instant disclosure provides a transparent conductive structure applied to a touch panel, comprising: a substrate unit 1, a first coating unit 2, a transparent conductive unit 3, and a second coating unit 4.

The substrate unit 1 includes at least one transparent substrate 10. The first coating unit 2 includes at least one first coating layer 20 formed on the top surface of the at least one transparent substrate 10. The transparent conductive unit 3 includes at least one transparent conductive layer 30 formed on the top surface of the at least one first coating layer 20. The at least one transparent conductive layer 30 includes a plurality of conductive circuits 300, and the conductive circuits 300 are arranged to form a predetermined circuit pattern P. The second coating unit 4 includes at least one second coating layer 40 formed on the top surface of the at least one transparent conductive layer 30. The at least one second coating layer 40 has a touching surface 400 formed on the top side thereof, and the touching surface 400 allows an external object (such as user's finger F, any type of touch pen, or etc.) to touch. In addition, the at least one second coating layer 40 can be substantially formed by mixing silicon oxide (such as $SiO_2$), aluminum oxide (such as $Al_2O_3$), lithium oxide and polytetrafluoroethylene. For example, the silicon oxide may occupy 60%~95% of the at least one second coating layer 40 by weight, the aluminum oxide may occupy 20%~25% of the at least one second coating layer 40 by weight, the lithium oxide may occupy 5%~10% of the at least one second coating layer 40 by weight, and the polytetrafluoroethylene may occupy 5%~10% of the at least one second coating layer 40 by weight.

Comparing to FIG. 6 with FIG. 2C, the difference between the fourth embodiment and the first embodiment is that: in the fourth embodiment, the at least one transparent conductive layer 30 includes at least two transparent conductive films (30A, 30B) stacked on top of each other and a plurality of embedded conductive circuits 300 formed between the at least two transparent conductive films (30A, 30B), and the embedded conductive circuits 300 are arranged to form a predetermined embedded circuit pattern P. In additional, the embedded conductive circuits 300 can be simultaneously embedded into one of the at least two transparent conductive films (30A, 30B) to contact the other transparent conductive film (30A or 30B). For example, the embedded conductive circuits 300 are simultaneously embedded into the transparent conductive film 30B (such as a first transparent conductive film) to contact the other transparent conductive film 30A (such as a second transparent conductive film). In other words, the embedded conductive circuits 300 can be formed between the at least two transparent conductive films (30A, 30B) to form the predetermined embedded circuit pattern P according to different conductive ranges. For example, the embedded conductive circuits 300 can be rolled and embedded between the at least two transparent conductive films (30A, 30B) by rolling. Hence, the conductive range (the electric conductivity) of the predetermined embedded circuit pattern P may be substantially between 0.8 and 3 ohm/square without using conductive circuits made of ultra-low conductive material.

In conclusion, the distance between the touching surface of the at least one second coating layer and the predetermined circuit pattern of the transparent conductive unit is reduced, thus the conductive range (the electric conductivity) of the predetermined circuit pattern P may be substantially between 0.8 and 3 ohm/square without using conductive circuits made of ultra-low conductive material. Moreover, the at least one second coating layer may be a high wear-resisting and low friction hard protection layer can be substantially formed by mixing silicon oxide, aluminum oxide, lithium oxide and polytetrafluoroethylene.

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. A transparent conductive structure applied to a touch panel, comprising:
   a substrate unit including at least one transparent substrate;
   a first coating unit including at least one first coating layer formed on the top surface of the at least one transparent substrate;
   a transparent conductive unit including at least one transparent conductive layer formed on the top surface of the at least one first coating layer, wherein the at least one transparent conductive layer includes a plurality of conductive circuits, and the conductive circuits are arranged to form a predetermined circuit pattern; and
   a second coating unit including at least one second coating layer formed on the top surface of the at least one transparent conductive layer, wherein the at least one second coating layer has a touching surface formed on the top side thereof, the touching surface allows an external object to touch, and the at least one second coating layer is substantially formed by mixing silicon oxide, aluminum oxide, lithium oxide and polytetrafluoroethylene.

2. The transparent conductive structure of claim 1, wherein the at least one transparent substrate is polyethylene terephthalate (PET), poly carbonate (PC), polyethylene (PE), poly vinyl chloride (PVC), poly propylene (PP), poly styrene (PS), or polymethylmethacrylate (PMMA), and the thickness of the at least one transparent substrate is between 50 µm and 125 µm.

3. The transparent conductive structure of claim 1, wherein the at least one first coating layer is a hard coating layer, the hard coating layer is an ultraviolet hardening layer, wherein each conductive circuit is a silver circuit, an aluminum circuit, or a copper circuit, and the conductive range of the predetermined circuit pattern is between 0.8 and 3 ohm/square, wherein the at least one second coating layer is a hard protection layer.

4. The transparent conductive structure of claim 1, wherein the conductive circuits are divided into a plurality of X-axis tracks extended along a transverse direction and a plurality of Y-axis tracks extended along a lengthwise direction and respectively insulated from and vertical to the X-axis tracks, the thickness of each conductive circuit is between 3000 Å and 5000 Å, the width of each X-axis track is between 3000 Å and 5000 Å, the distance between every two X-axis track is between 10 µm and 20 µm, the width of each Y-axis track is between 1000 Å and 2000 Å, and the distance between every two Y-axis track is between 5 µm and 15 µm.

5. The transparent conductive structure of claim 1, wherein the conductive circuits are formed on the top surface of the at least one transparent conductive layer, and the conductive circuits are covered by the at least one second coating layer.

6. The transparent conductive structure of claim 1, wherein the conductive circuits are embedded into the at least one transparent conductive layer, and the conductive circuits are covered by the at least one second coating layer.

7. The transparent conductive structure of claim 1, wherein the conductive circuits are formed on the bottom surface of the at least one transparent conductive layer and embedded into the at least one first coating layer.

8. The transparent conductive structure of claim 1, wherein the at least one transparent conductive layer includes at least two transparent conductive films stacked on top of each other, and the conductive circuits are formed between the at least two transparent conductive films.

9. The transparent conductive structure of claim 8, wherein the conductive circuits are simultaneously embedded into one of the at least two transparent conductive films to contact the other transparent conductive film.

10. A method of making a transparent conductive structure applied to a touch panel, comprising the steps of:
    providing a substrate unit including at least one transparent substrate;
    forming at least one first coating layer on the top surface of the at least one transparent substrate;
    forming at least one transparent conductive layer on the top surface of the at least one first coating layer, wherein the at least one transparent conductive layer includes a plurality of conductive circuits, and the conductive circuits are arranged to form a predetermined circuit pattern; and
    forming at least one second coating layer on the top surface of the at least one transparent conductive layer, wherein the at least one second coating layer has a touching surface formed on the top side thereof, the touching surface allows an external object to touch, and the at least one second coating layer is substantially formed by mixing silicon oxide, aluminum oxide, lithium oxide and polytetrafluoroethylene.

* * * * *